United States Patent [19]

Levine

[11] 4,295,813
[45] * Oct. 20, 1981

[54] APPARATUS FOR MOLDING STRAND-MOUNTED PLASTIC MEMBERS

[76] Inventor: Irving Levine, 23555 Park Belmonte, Calabassas Park, Calif.

[*] Notice: The portion of the term of this patent subsequent to Oct. 20, 1994, has been disclaimed.

[21] Appl. No.: 401,979

[22] Filed: Oct. 1, 1973

[51] Int. Cl.³ .............................................. B29F 1/00
[52] U.S. Cl. .................................... 425/121; 264/161;
425/122; 425/552; 425/577; 425/806
[58] Field of Search .................. 425/121, 122, 126 R,
425/129, 444, 552, 577, 806; 264/161, 163

[56] References Cited

U.S. PATENT DOCUMENTS

| | | | |
|---|---|---|---|
| 2,386,697 | 10/1945 | Lynch | 425/121 |
| 2,497,951 | 2/1950 | Low | 425/121 |
| 3,013,303 | 12/1961 | Amazon | 264/161 |
| 3,443,001 | 5/1969 | Adair | 264/161 |
| 3,508,299 | 4/1970 | Ahern | 425/577 X |
| 3,577,843 | 5/1971 | Kutik | 425/577 X |
| 3,591,897 | 7/1971 | Perras | 425/243 X |

FOREIGN PATENT DOCUMENTS 1112281 8/1961 Fed. Rep. of Germany ...... 264/161

Primary Examiner—Thomas P. Pavelko
Attorney, Agent, or Firm—Michael A. Painter

[57] ABSTRACT

An apparatus and method for mounting thermoplastic materials directly upon a string medium. A hot runner system or three-plate mold provides the cavities for integrating the molten thermoplastic material and string medium. Molten thermoplastic is injected at a plurality of input apertures along a bifurcated mold, the bifurcated mold having complementary cavities joined by subrunners to transmit the molten thermoplastic material into each cavity. Each cavity is adapted to form a member which is to be permanently affixed on the string medium and includes aligned channels for receiving the stringed medium prior to injection of the molten thermoplastic material. The stringed medium is disposed within the channels prior to injection of the molten thermoplastic material. Under appropriate temperature and pressure conditions, the injected thermoplastic runner flows into subrunners filling each cavity of the bifurcated mold, thermoplastic bodies forming about the stringed medium in a permanent manner.

5 Claims, 8 Drawing Figures

APPARATUS FOR MOLDING STRAND-MOUNTED PLASTIC MEMBERS

BACKGROUND OF THE INVENTION

1. Field of the Invention

The present invention generally relates to the molding of thermoplastic materials and more particularly to apparatus and methods of mounting thermoplastic materials on stringed media.

2. Prior Art

There are several classes of processes which are disclosed by the prior art for mounting thermoplastic materials on a supporting medium. The processes are generally described as compression molding, injection molding or casting. Conventional compression molding and injection molding processes are generally carried out by subjecting the thermoplastic material and the supporting media to pressure above 1500 pounds per square inch and at temperatures in excess of 360° F. Depending upon the selection of plastic material and the shape of the mold, molding pressures could be in the order of 10,000 pounds per square inch. The use of high molding pressures is encountered in transfer molding which is an analog of compression and injection molding.

Casting is a typical method utilized in the electronics industry for encapsulating or otherwise embedding circuits or other media within a protective covering. The casting method is expensive and is not applicable to the mass production application to which the present invention is applied. One of the problems inherent in casting is the typical required step of curing the plastic material at elevated periods for periods up to or greater than 12 hours, the exact cure time being dependent upon the temperature, mold shape and the selection of material.

The present invention is directed toward an application whereby thermoplastic bodies are mounted upon a supporting substrate to which typically takes the form of a string or other similar structure. One of the processes disclosed in the prior art for encapsulating a supporting media utilizes a two-piece mold which provides access channels for the supporting medium which in this case is typically a wire or other like structure. The thermoplastic material is enclosed within the mold and the mold raised to the gel temperature. The thermoplastic material is caused to flow around the supporting medium as well as any object to be encapsulated.

The present invention is directed toward a mass production operation whereby a plurality of stringlike structures are passed through the mold, thermoplastic objects being securely fixed to the string in sequential operations. None of the processes described in the prior art exhibit the necessary flexibility to permit execution of the stated operation. The problems inherent in those systems disclosed in the prior art are substantially solved through the use of injecting a heated thermoplastic runner into a bifurcated mold, each half of the mold containing complementary cavities to define the object to be mounted. Prior to injection of the thermoplastic material, the supporting medium is aligned across the cavity, the supporting medium itself being used to prevent flow from one cavity to the other. Subrunners of the thermoplastic material provide for injection into all cavities in a manner which facilitates removal of the molded material subsequent to cooling.

SUMMARY OF THE INVENTION

The present invention comprises apparatus and a method for molding thermoplastic materials upon a supporting medium. Although the present invention is applicable to a variety of applications, the present invention shall be considered in connection with the fabrication of strands of decorative beads. The formation of these products by way of the present invention substantially utilizes the advantages provided by the present invention apparatus and method of operation. The beads comprise a plurality of objects spaced along the supporting medium, the objects being different shapes, sizes and volumes. Although a hot runner or two-plate mold system can be employed, the form of the present invention apparatus described utilizes a three-plate mold. The portion of the mold used for the formation of the bead strand is bifurcated, each half of the mold containing complementary cavities corresponding to the different shapes to be formed along the supporting strand. The complementary cavities are joined by aligned channels adapted to receive the supporting strand. A supporting strand is typically a nylon strand and is delivered to the molds in a plurality of parallel paths. The nylon strand serves the function of separating the adjacent cavities in such a manner to prevent the passage of molten thermoplastic material.

The molten thermoplastic material is delivered to the complementary molds by a series of subrunners. Since the stands of decorative beads comprise a number of separate objects each of which may vary in size, shape and volume, it is necessary to insure that each cavity will be filled with the molten thermoplastic material prior to cooling. Each subrunner is delivered through a gate of predetermined size, the size of the gate being dependent upon the volume of thermoplastic material being delivered within the cavity. The delivery of molten thermoplastic material must be such to insure that the gate will be severed at the bead itself to preclude any residue thereof. Any portion of the gate which remains affixed to the bead will merely destroy the decorative effect of the bead thereby reducing the value of the process and the apparatus for making same.

The three-plate mold is maintained under pressure for a period of time necessary for the injection of the molten thermoplastic material as well as the necessary cure time. Adequate means for cooling the molds is provided internally in such a manner such as to insure proper filling of the bead cavities as well as minimizing the cure time.

It is therefore an object of the present invention to provide an improved apparatus and method for forming thermoplastic objects upon a supporting medium.

It is another object of the present invention to provide an improved apparatus and method of forming a plurality of parallel strands of thermoplastic objects.

It is still another object of the present invention to provide an improved method and apparatus for permanently mounting thermoplastic beads upon a supporting medium.

It is yet another object of the present invention to provide an improved apparatus and method of forming string mounted thermoplastic beads in a simplified and economical manner.

The novel features which are believed to be characteristic of the invention, both as to its organization and method of operation, together with further objectives and advantages thereof will be better understood from

DESCRIPTION OF THE PRESENTLY PREFERRED EMBODIMENT

Figure 1:
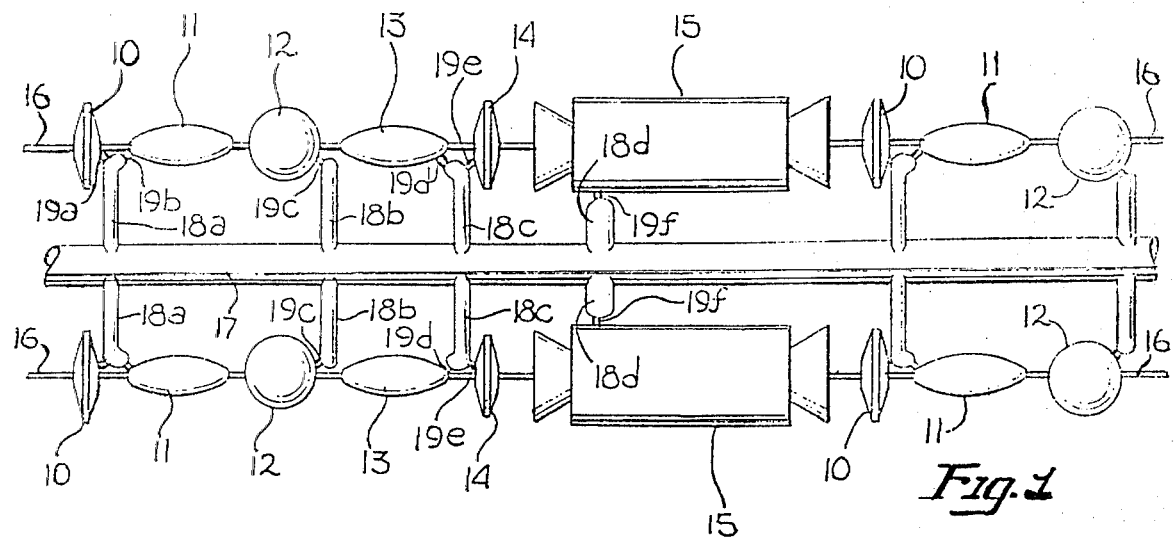
FIG. 1 is a side elevation view of a plurality of thermoplastic members mounted upon a supporting string in accordance with the present invention.

An understanding of the product of the present invention apparatus and process can be best seen by reference to FIG. 1 wherein the output of the present invention device and process can be best seen. The product shown in FIG. 1 constitutes a pair of strands of thermoplastic members 10, 11, 12, 13, 14 and 15 mounted upon the supporting members 16. The product illustrated in FIG. 1 is the direct output of the present invention apparatus as shown by the remaining presence of thermoplastic runners 17 and subrunners 18a, 18b, 18c and 18d. Although only a small number of beads 10-15 are shown in FIG. 1, each of the strands produced by the present invention apparatus and method is substantially an endless chain which is severed under the dictates of commercial standards.

As will be described hereinbelow, each bead 10-15 is formed by filling a cavity within a three-plate mold through the use of runner 17 and subrunners 18a-18d. Although the scope of the present invention encompasses the use of a hot runner or two-plate system, the preferred form of the present invention utilizes a three-plate mold. While the thermoplastic material comprising runner 17 and subrunners 18a-18d are in a molten or flowable condition, gates provide for an annular channel from the runner and subrunner cavities to those cavities used for forming beads 10-15. As shown in FIG. 1, gates 19a-19f provide for transmission of molten or flowable thermoplastic material from the runner and subrunner cavities to the cavities used for forming beads 10-15 respectively.

Figure 2:
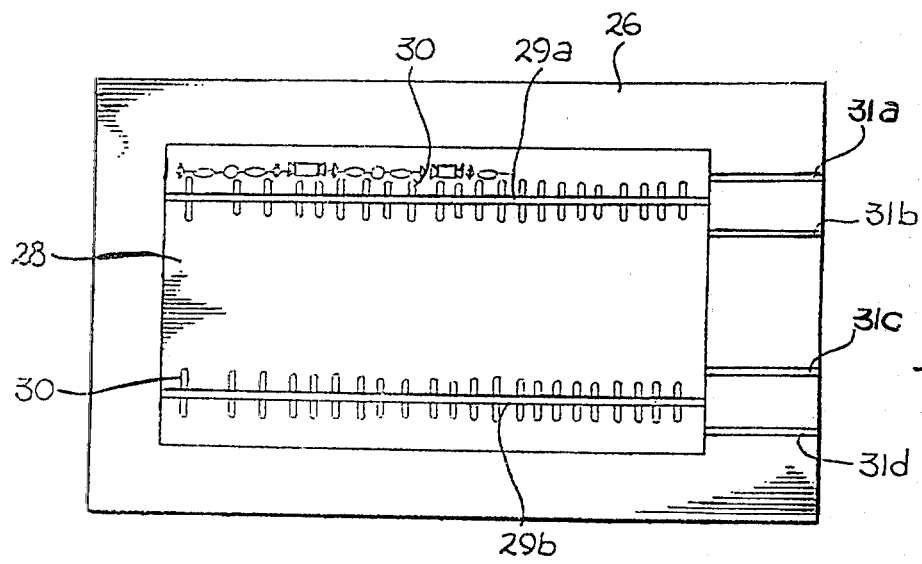
FIG. 2 is a side elevation view of one member of the three-plate mold illustrating the input of the supporting member prior to molding the thermoplastic material.
Figure 3:
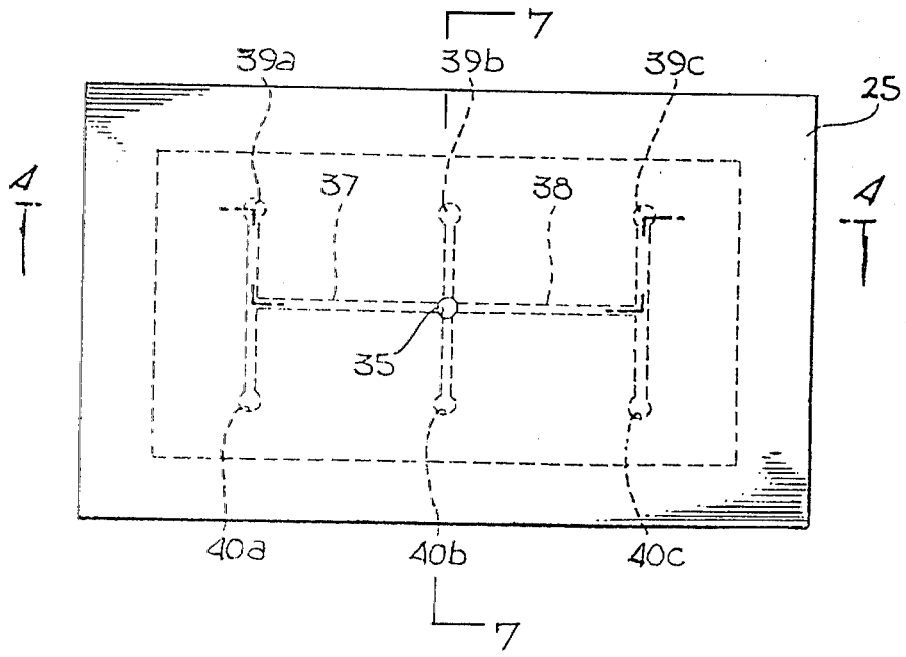
FIG. 3 is a rear elevation view of the second member of the three-plate mold illustrating the input for molten thermoplastic material.
Figure 4:
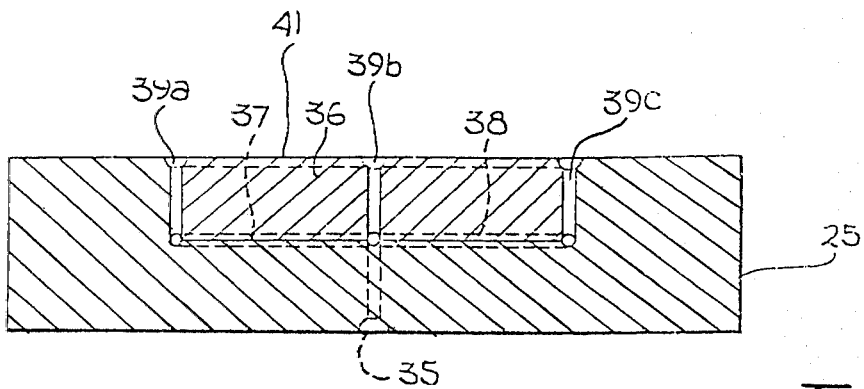
FIG. 4 is a cross-sectional view of the plate member shown in FIG. 3 taken through line 4—4 of FIG. 3.
Figure 5:
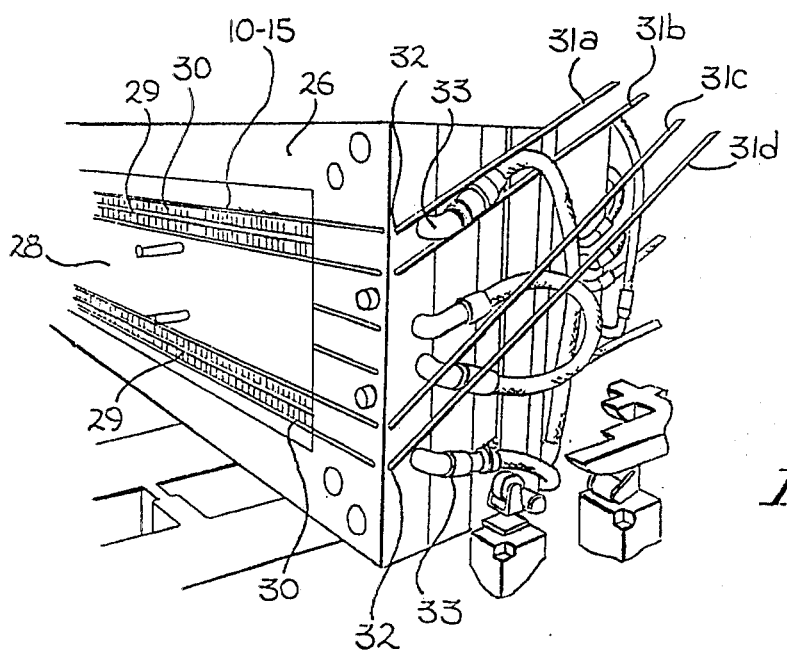
FIG. 5 is a perspective view of the mounted plate shown in FIG. 2 including the cooling ducts.
Figure 6:
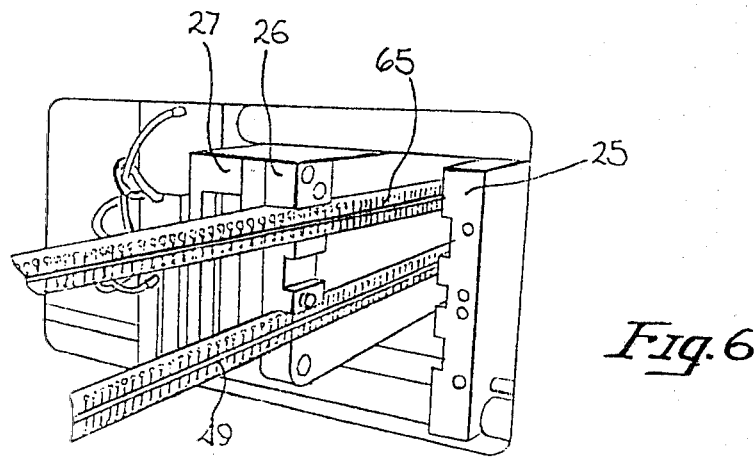
FIG. 6 is a perspective view of the three-plate mold illustrating the output of mounted thermoplastic members.

Referring now to FIGS. 2, 3 and 4, an understanding of the apparatus used to manufacture the product shown in FIG. 1 and the process for making same can be best seen. As can be seen in FIG. 6, the present invention apparatus utilizes a three-plate mold, the molds being generally designated by the reference numerals 25, 26 and 27. Plate 26 is shown in detail in FIG. 2, plate 26, including insert 28, constitutes one-half of the mold used for fabricating the beads shown in FIG. 1. Referring now to FIG. 2 and FIG. 5, insert 28 includes one-half of the cavities 10-15 used for fabricating the products shown in FIG. 1. Insert 28 includes a pair of parallel, transverse cavities 29a and 29b which are adapted to receive runners 17 when plate 26 engages plate 25 which includes an insert which is complementary to that designated by the reference numeral 28. Communicating with each cavity 29a and 29b are a plurality of subrunner cavities 30, the subrunner cavities 30 being adapted to receive the subrunners 18a-18d of thermoplastic material when plate 26 engages plate 25 during the present invention process.

The present invention permits a number of strands of mounted thermoplastic subjects to be fabricated in parallel. As shown in FIG. 2 and FIG. 5, supporting media 31a-31d are disposed through apertures 32 in plate 26, supporting media 31a-31d being in parallel spaced relation with each other, grouped in pairs defined by reference numerals 31a and 31b, and 31c and 31d respectively. As will be explained hereinbelow, cooling lines 33 are disposed in plate 26 adjacent each strand of thermoplastic cavities to provide for cooling of the molten or flowable thermoplastic material when the subject strands are being fabricated. This will be explained in detail hereinbelow.

The structure of the complementary plate 25 can be best seen by reference to FIG. 3 and FIG. 4. FIG. 3 illustrates a rear, elevation view of plate 25, FIG. 4 illustrating a cross-sectional view of the thermoplastic channels disposed in plate 25. Plate 25 upon the surface opposite from plate 26 contains an insert which is a mirror image of insert 28, and therefore all discussion with respect to insert 28 applies equally well to that contained within plate 25. The injection of molten or flowable thermoplastic material is accomplished through aperture 35 disposed in the rear surface of plate 25. Each aperture 35 includes an orifice through plate 25 and the insert 36 which is the complementary insert to that described by the reference numeral 28. In addition, aperture 35 communicates with transverse channels 37 and 38 which transversely extend across insert 36. Perpendicular channels 39a-39c and 40a-40c both depend through the depth of insert 36. Channels 39a, 39b and 39c communicate with cavity 29a of insert 28, channels 40a, 40b and 40c communicating with cavity 29b of insert 28. As will be explained hereinbelow, when plates 25 and 26 are in abutment, the complementary cavities of inserts 28 and 36 are formed for the transmission of molten or flowable thermoplastic material from aperture 35 through the formation of runners 17, subrunners 18a-18d and beads 10-15.

Figure 8:
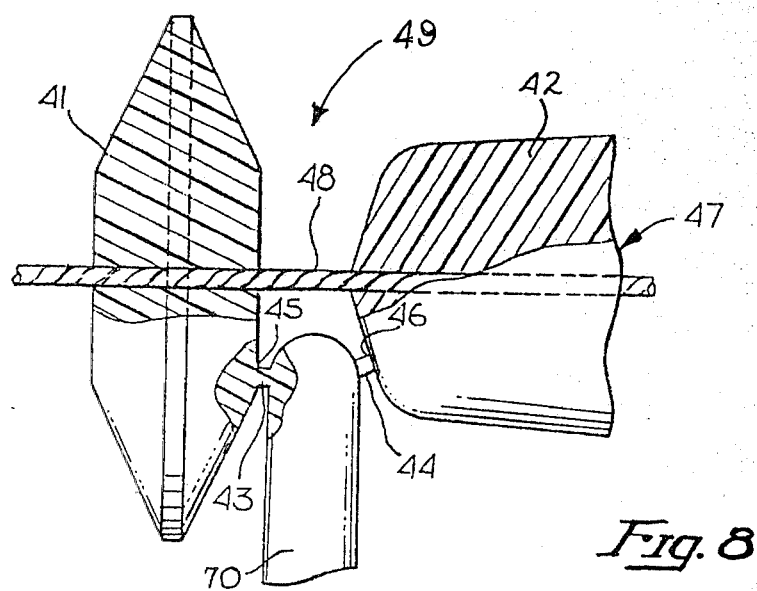
FIG. 8 is an enlarged cross-sectional view of mounted thermoplastic members including the gates from the thermoplastic subrunners.

An understanding of the molding of thermoplastic members upon the supporting substrate can be best gained by reference to FIG. 8 wherein an enlarged, cross-sectional view thereof is shown. Subrunner 49 is a solidified mass of thermoplastic material which is filled in accordance with the present invention process. As stated hereinabove, in order to fill the cavities adapted to receive the thermoplastic material which is to form beads 41 and 42, gates 43 and 44 are disposed intermediate subrunner 70 and beads 41 and 42 respectively. In order to provide a product which has a suitable appearance, beads 41 and 42 must be severed from gates 43 and 44 at the points of intersection 45 and 46 respectively. Therefore, the gate size of gates 43 and 44 must therefore be a compromise between a diameter which is large enough to insure that the cavities for beads 41 and 42 will be completely filled prior to cooling, but not so large so as to leave any residue attached to beads 41 and 42 which will detract from the appearance thereof. The gate size will vary with the injection pressure as well as with the size of the bead. A suitable gate diameter is in the range of 0.015 to 0.022 inches. It has also been found that the pigment used to color the thermoplastic materials can influence injection pressure. Where an oil base or a synthetic oil base pigment is used, higher injection pressure is necessary. As an example, injection pressure of 400-900 pounds per square inch is used to insure that the molten or flowable thermoplastic material is totally received by inserts 28 and 36 (FIG. 2 and FIG. 4) prior to initiating the curing cycle.

Referring again to FIG. 8, beads 41 and 42 must be mounted upon the supporting strand 47 in a manner which will insure substantial permanency as well as facilitate processing. As discussed hereinabove, strand 47 serves as the purpose of isolating each cavity used to form beads 41 and 42. As an example, portion 48 of strand 47 intermediate beads 41 and 42 was disposed intermediate the cavities being adapted to receive the thermoplastic material used to form beads 41 and 42. Portion 48 of strand 47 isolates the cavities receiving the thermoplastic material. As can be seen in FIG. 8, there is substantially no residue of the thermoplastic material in or about portion 48 of strand 47 external to the boundary of either bead 41 or 42. It has been found that a channel for strand 47 should be approximately 0.025 inches. The material used to implement strand 47 must be sufficient to withstand the forces imposed upon the three-plate mold, the forces being typically in the range of 200 tons. It has been found that nylon is suitable to implement strand 47 since it will withstand the forces on the three-plate mold as well as the temperatures used to flow the thermoplastic material, i.e., 360°-400° F.

As mentioned hereinabove, one of the objects of the present invention was to provide apparatus and a method for fabricating strands of mounted thermoplastic members in parallel. Referring to FIG. 5 and FIG. 6, an understanding of the manner in which the present invention apparatus and method meet the stated objective. As is shown in FIG. 5, strands 33 are input to plate 26 via apertures 32, the strands being disposed in parallel pairs across the respective input channels of insert 28. When plates 25, 26 and 27 are brought in contact, and after the thermoplastic material is injected as described in connection with FIG. 3 and FIG. 4, two sets 49 and 50 of a pair of strands of mounted thermoplastic members will be produced. This is amply shown in FIG. 6. Where the gate size is suitable as shown in FIG. 1, beads 10-15 mounted upon strands 16 can be stripped away from the solidified subrunners 18a-18d leaving the separated strands of mounted thermoplastic beads.

Figure 7:
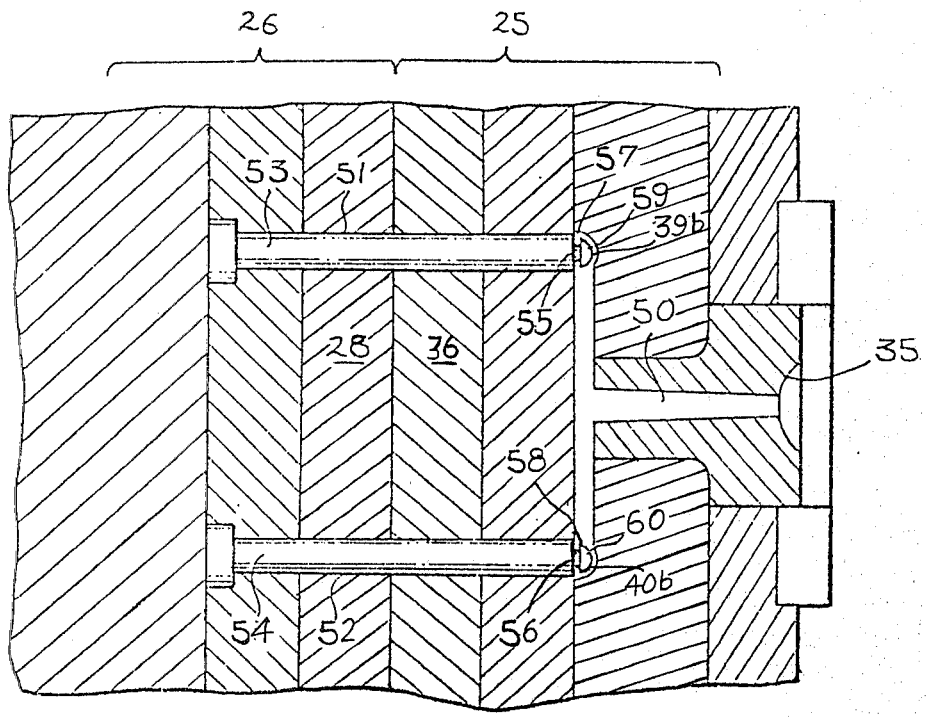
FIG. 7 is a partial, cross-sectional view of the joined three-plate mold including the means for disconnecting the thermoplastic runner subsequent to the molding process as shown in FIG. 3 taken through line 7—7 of FIG. 3.

As was described in connection with FIG. 3 and FIG. 4, molten or flowable thermoplastic material is disposed at aperture 35 of plate 25, the molten thermoplastic material flowing into channels 37 and 38 and eventually reaching the complementary cavities disposed in inserts 28 and 36. One of the problems inherent in any injection process is removal of the unused thermoplastic material. It has been described how the strands of beads are separated from the runners and subrunners. In order to fully remove all unused solidified thermoplastic material in a manner which will meet the objective of simplicity and economy, the solidified thermoplastic material in channels 37 and 38 and intermediate aperture 35 must also be removed. Referring now to FIG. 7, a side elevation, cross-sectional view of plates 25 and 26 in the engaged position is shown. As was described in connection with FIGS. 3 and 4, molten or flowable thermoplastic material injected at aperture 35 is input through tapered channel 50 and is distributed at channels 37 and 38, the termination thereof being at the interface of insert 28 and 36. Subsequent to the curing cycle, material will be solidified in channels 37, 38 and 50. Referring now to FIG. 7, the cross-section view shown therein illustrates the manner in which the solidified runners can be removed subsequent to the curing cycle. Channel 50 depends into aligned channels 39b and 40b. In order to effectively remove the solidified runner, bores 51 and 52 are disposed through inserts 28 and 36 of plates 26 and 25. Bores 51 and 52 being in parallel relationship with each other as well as with channel 50. Pins 53 and 54 are adapted to be slidingly received within bores 51 and 52 respectively and are coupled to plate 26. Pins 53 and 54 extend to the boundary of aligned channels 39b and 40b. The terminus 55 and 56 of pins 53 and 54 respectively depend into axial protrusions 57 and 58 respectively which then extend into knobs 59 and 60 respectively each of which have a greater diameter than protrusions 57 and 68.

When thermoplastic material is solidified within channels 37, 38 and 50, the thermoplastic material will be formed about knobs 59 and 60 and their axial bases 57 and 58 respectively. When plates 25 and 26 are separated, the thermoplastic material in channels 37, 38 and 50 will be severed from the remaining solidified thermoplastic material since knobs 59 and 60 will tend to sever or otherwise fracture the material to the joint shown. Although FIG. 7 illustrates only a single vertical structure for severing the thermoplastic runner from the remaining molded material, it is clear that a number of pins and like structures are utilized throughout the plates where they are deemed necessary.

As stated, an object of the present invention process is to permit the formation of a plurality of strands of thermoplastic beads in a simultaneous operation. The basic material used for implementation of the product can be substantially any conventional thermoplastic material such as polyvinyl chloride, but the preferred form of the present invention utilizes polystyrene. The thermoplastic material is heated to a temperature of 360°-400° F. to place the material in a molten or flowable condition or otherwise make it suitable for injection into the three-plate mold. Injection pressure is in the range of 400-900 pounds per square inch, the injection pressure being dependent on the size of the beads, the number of beads or the type of pigmentation used to provide color to the beads. The three-plate molds are subjected to forces in the range of 200 tons. After the applicable force is imposed upon the plates, the thermoplastic material is injected into plate 25 at aperture 35 and intermediate the cavities in bead inserts 28 and 36. Once the thermoplastic material has been injected to the three-plate mold, the cure time is initiated. Since the thermoplastic material must be solidified prior to opening the molds, an interval of approximately 10-20 seconds is utilized. The curing of the thermoplastic material also utilizes cooling fluid at a temperature approximately 40° F., the cooling fluid being input to plate 26 via cooling lines 33 (FIG. 5). Subsequent to the expiration of the cure time, the sets of joined beads 49 and 50 (FIG. 6) are extracted from the separated plates 25 and 26 (FIG. 6), additional strands 31a–31d (FIG. 5) being extended across plate 26 and insert 28 and into the applicable strand slots. Plates 25 and 26 are again closed, subjected to the stated force and thermoplastic again injected as described hereinabove. Since the thermoplastic materials can be remelted, the solidified runner and subrunner discussed in connection with FIG. 7 can be recycled after they have been removed from the fabricated strand, the solidified runners and subrunners being reground and used to augment the supply of thermoplastic material.

The present invention comprises an apparatus and method for producing multiple strands of thermoplastic beads in a more efficient and economical manner than provided in the prior art. The beads are mounted upon a nylon supporting media in a manner which allows at least four strands to be fabricated simultaneously. The nylon strands are used to separate bead cavities in the molds and thereby simplify the entire process and apparatus. Since the basic thermoplastic material can be recycled, the separation of the beads by proper design of the gates allows separation of the strands of beads from the solidified runners and subrunners thereby permitting recycling of the waste materials.

I claim:

1. An apparatus for the simultaneous fabrication of a plurality of strands of plastic elements on a supporting medium comprising:
    (a) a first plate having a first insert, said insert comprising a plurality of parallel pairs of plastic elements fabricating members, each pair of plastic element fabricating members including a plurality of aligned cavities, each cavity being in communication with an adjacent cavity by a support medium channel, all of said support medium channels being in axial alignment with one another, the supporting medium being force fit within said support medium channels whereby said aligned cavities are isolated from one another, a runner channel parallel to and intermediate the support medium channels of the pair of plastic element fabricating members, a plurality of subrunner channels depending from and communicating with said runner channels and gating means for providing communication between said subrunner channels and said cavities, said first plate further including axially aligned bores perpendicular to said support medium channels;
    (b) a second plate having a second insert adapted to be placed adjacent said first insert, said second insert having cavities, support medium channels, runner channels and subrunner channels complementary to those disposed in said first insert, and including plastic input means for receiving flowable plastic, said plastic input means being disposed through said second plate in communication with said runner channel in said second insert, said second plate further including aligned bores in axial communication with the aligned bores in said first plate, said aligned bores communicating with said plastic input means in said second plate;
    (c) severing pins coupled to said first plate with the aligned bores and adapted to be slidably received within the aligned bores in said second plate and said second insert, the terminus of said pins depending into a first axial member having a predetermined diameter, said first axial member depending into a second axial member having a diameter larger than that of said first axial member whereby the plastic fractures at said first and second axial members when the first and second plates are separated;
    (d) supply means for supplying a pressurized source of flowable plastic, said supply means coupled to said plastic input means; and
    (e) means for imposing opposing forces upon said first and second plates whereby the complementary cavities, support medium channels, runner channels and subrunner channels of said first and second inserts are adjacent one another.

2. An apparatus as defined in claim 1 further including support medium supply means for supplying a source of supporting medium for each plastic element fabricating member.

3. An apparatus as defined in claim 1, said first plate further including cooling means for receiving cooling fluid, said cooling means being disposed within said first plate adjacent said bead fabricating members.

4. An apparatus for simultaneously fabricating a plurality of thermoplastic elements on a supporting string comprising:
    (a) a first plate having a first insert, said insert comprising a plurality of parallel pairs of element fabricating members, each pair of element fabricating members including a plurality of aligned element cavities, each element cavity being in communication with an adjacent element cavity by a supporting string channel, all of said support string channels being in alignment with one another, and being adapted to receive the supporting string therein whereby each of said cavities is sealed, a thermoplastic runner channel parallel to and intermediate the support string channels of the pair of element fabricating members, a plurality of thermoplastic subrunner channels depending from and communicating with said thermoplastic runner channels, and gating means for providing communication between said thermoplastic subrunner channels and said bead cavities;
    (b) a second plate having a second insert adapted to be forced adjacent said first insert, said second insert having element cavities, support string channels, thermoplastic runner channels and thermoplastic subrunner channels complementary to those disposed in said first insert, and including thermoplastic input means for receiving flowable thermoplastic material, said thermoplastic input means being disposed through said second plate and in communication with said thermoplastic runner channels;
    (c) a severing pin secured to said first plate and adapted to be slidably engaged through said second plate in communication with said thermoplastic input means, the terminus of said pin adjacent said thermoplastic input means depending into a first axial member having a predetermined diameter, said first axial member depending into a second axial member having a diameter which is larger than that of said first axial member whereby the thermoplastic disposed in the thermoplastic input means is fractured in the vicinity of said first and second axial members when the first and second plates are separated;

(d) supply means for supplying a pressurized source of flowable thermoplastic, said supply means coupled to said thermoplastic input means;

(e) support string supply means for supplying a source of support string for each of said plurality of element fabricating members; and (f) means for imposing opposing forces upon said first and second plates whereby the complementary bead cavities, support string channels, thermoplastic runner channels and thermoplastic subrunner channels of said first and second inserts are adjacent one another.

5. An apparatus as defined in claim 4, said first plate further including cooling means for receiving cooling fluid, said cooling means being disposed within said first plate adjacent said element fabricating members.

* * * * *